Dec. 22, 1959 M. B. NEHER 2,917,921
MECHANICAL APPARATUS FOR TESTING FLEXIBLE AND PLIABLE MATERIAL
Filed May 4, 1955 2 Sheets-Sheet 2
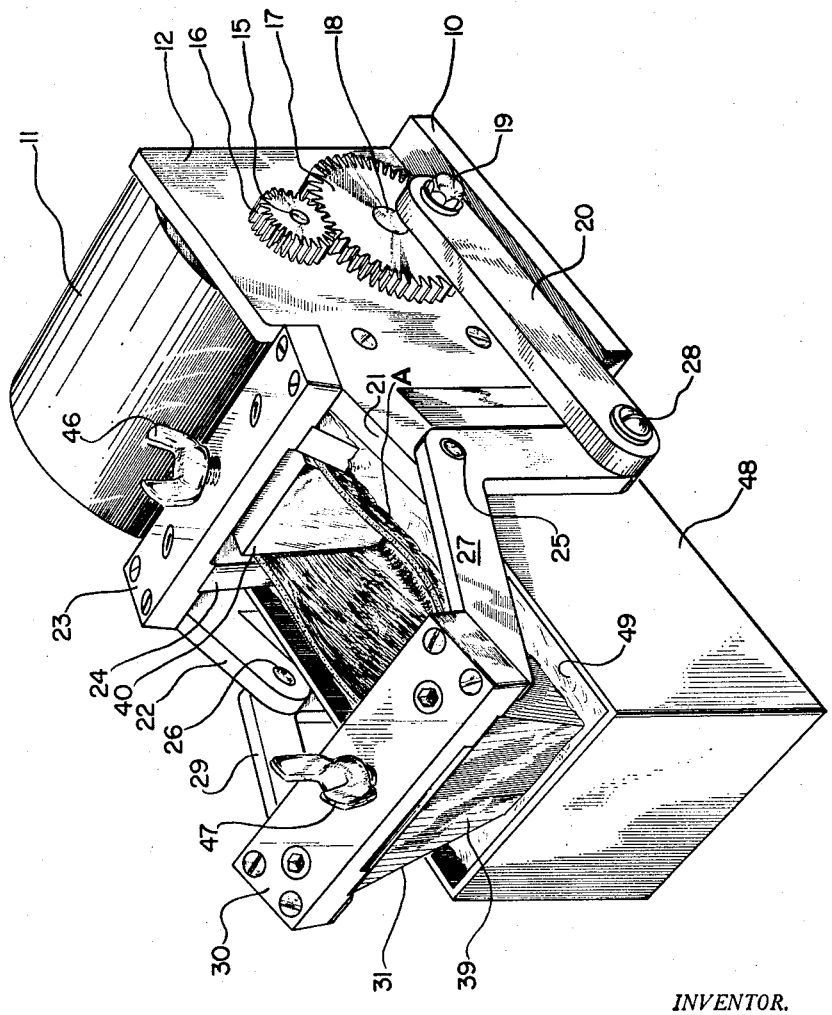
INVENTOR.
Maynard B. Neher
BY Gray, Mase & Dunson
ATTORNEYS.

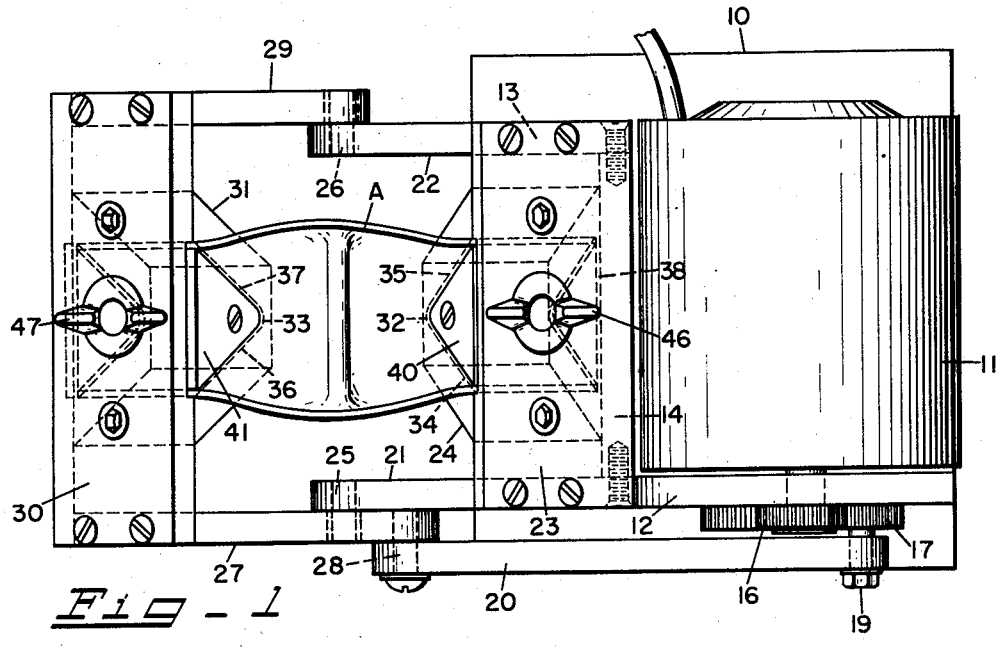

United States Patent Office 2,917,921
Patented Dec. 22, 1959

2,917,921

MECHANICAL APPARATUS FOR TESTING FLEXIBLE AND PLIABLE MATERIAL

Maynard B. Neher, Columbus, Ohio, assignor, by mesne assignments, to The Battelle Development Corporation, Columbus, Ohio, a corporation of Delaware Application May 4, 1955, Serial No. 505,962

4 Claims. (Cl. 73—100)

This invention relates to a test apparatus or machine for flex-testing of flexible and pliable materials. More particularly, this invention concerns a test apparatus or machine for a flex test or for a dynamic liquid-penetration test for numerous flexible and pliable materials, such as leathers, rubbers, plastics, papers, fabrics, laminated foil barriers, and sheetings or barriers of combinations of said materials.

In testing flexible and pliable materials, for example, in the testing of leather for waterproofness, it is desirable to simulate actual operational conditions as would be encountered by the leather product in end use. It is also desirable to have a convenient, rapid, mechanical test capable of reproducible results for evaluation of leathers or treated or coated leathers. Manual tests on leathers are unsatisfactory because no two individuals successively perform identical tests in that the various individuals are incapable of successively flexing leather in the same manner with the same force. Commercially available mechanical test apparatuses to date have been complicated contrivances, and, while sometimes capable of giving reproducible results, are relatively expensive.

The present invention provides a mechanical apparatus of inexpensive manufacture that subjects a sample of a flexible and pliable material to repeated cycles of compression causing the material sample to buckle and flex. The test performed by one embodiment of the apparatus of this invention may be a dynamic liquid-penetration test, where the sample of a test material is partially immersed in a liquid bath.

Flexing test results and dynamic liquid-penetration test results are extremely valuable in determining the properties of materials. It is desirable to select suitable materials for manufacture of high-quality products and to maintain the high quality of the manufactured products by use of materials of only certain desirable properties. Flexing test results will be indicative of the "life" of the material in that the test results of one material compared to the results of another material will be indicative of the relative period of permissible use before cracking or total failure occurs. Dynamic liquid-penetration test results of materials will be indicative of the degree of resistance to liquid penetration of materials tested under the simulated dynamic motions of the present invention.

An object of this invention is to provide a durable and inexpensive testing machine for flex-testing of flexible and pliable materials.

Another object of this invention is to provide a durable and inexpensive testing machine for a dynamic liquid-penetration test on flexible and pliable materials.

Still another object of this invention is to provide an improved test machine or apparatus, wherein the clamp-assembly members holding the material sample are uniquely positioned, so that tests with a large degree of sample flexing may be obtained rapidly with reproducible results.

Still another object of this invention is to provide an improved test machine or apparatus for dynamic liquid-penetration tests on flexible and pliable materials, wherein the clamp-assembly members are uniquely positioned while continuously maintaining the buckling and creasing portion of the test material in a liquid without substantial liquid leakage or flow into the hollow trough of the test sample other than the liquid leakage at the buckling and creasing portion of the test sample of material when material failure occurs.

Still another object of this invention is to provide an improved test machine or apparatus for dynamic liquid-penetration tests on flexible and pliable materials that is capable of reproducible results, wherein the clamp-assembly members are uniquely positioned and the clamp-assembly members have closed back sides so that a minimum of liquid will leak, splash, or run into the hollow trough of the clamp test material and so that no liquid will contact the portion of the test material that extends beyond the resilient material surfaces of the clamping-block-assembly insert.

Still another object is to provide a dynamic water-penetration test for testing leather which has been given a waterproofing treatment.

Further objects and advantages of this invention will be readily seen and appreciated as the same become better known and understood by reference to the following detailed description, when considered in conjunction with the accompanying drawings, wherein:

Fig. 1 is a plan view of an embodiment of the invention, in which the material sample is shown in a flexed or compressed position;

Fig. 2 is an elevational view of the apparatus of Fig. 1 showing the material sample in a straight-of-way or nonflexed position;

Fig. 3 is a perspective view of a clamping-block- assembly insert.

Fig. 4 is a perspective view of the apparatus illustrated in Figs. 1 and 2 and includes a liquid container holding a liquid.

The present invention provides a mechanical apparatus for testing of flexible and pliable materials, wherein the unique positioning of the clamp members and the provision of closed back sides for the clamp members permit a rapid, reproducible test to be made.

In Figs. 1, 2, and 4 there is shown any suitable base plate 10, upon which is mounted a power source, in these illustrations an electric motor 11. Side plate 12 and side plate 13 are affixed to the base plate 10. Support plate 14 is affixed to base plate 10 and side plates 12 and 13, firmly holding the same. A drive shaft 15 from the electric motor 11 is keyed to driving gear 16. Driving gear 16 meshes with gear 17 which is rotatably mounted on pin 18, which is fastened to side plate 12. Mounted off center on gear 17 is a pin 19 to which is rotatably mounted link 20.

Integral with side plate 12 and side plate 13 and extending therefrom in the plane of side plate 12 and side plate 13, respectively, are arms 21 and 22, respectively. Fastened to the side plates 12 and 13, and connecting these plates, is a connecting plate 23 to which stationary clamp-assembly member, generally designated 24, is attached. Near the terminal portion of the arm 21 is affixed pin 25. On pin 25 a lever 27 is rotatably mounted. On one arm of the lever 27 is mounted a pin 28. The end of link 20, farthermost from the end of link 20 rotatably mounted to pin 19, is rotatably mounted to pin 28. Near the terminal portion of arm 22 is mounted pin 26. Rotatably mounted on pin 26 is one end of a link 29. Connecting the end of link 29 farthermost from the end of link 29 rotatably mounted on pin 26, and the arm of lever 27 farthermost from the arm of lever 27 to which pin 28 is affixed, is fastened a connecting plate 30 to which a movable clamp-assembly member, generally designated 31, is attached.

As shown in the drawings, clamp assemblies 24 and 31 may be of similar construction. Each of the clamp-assemblies 24 and 31 have blunt-bottomed V-shaped notches 32 and 33, respectively, with sides 34 and 35, and 36 and 37, respectively, mounted in a V-shaped trough configuration and closed back sides 38 and 39, respectively. Each of the clamp-assembly members 24 and 31, respectively, are attached to connecting plates 23 and 30, respectively, with the open sides of clamp assemblies 24 and 31, respectively, facing each other.

Fitting between the V configuration of the sides of each clamp-assembly member in the illustrated apparatus are blunt-bottomed V-shaped clamping-block-assembly inserts 40 and 41. Clamping-block-assembly inserts 40 and 41 are identical and one clamping-block-assembly insert 40 is illustrated in detail in Fig. 3. Each of the clamping-block-assembly inserts 40 and 41 has a resilient material surface 42. In the top portion of each clamping-block-assembly insert is an indentation 43. Through the center of connecting plate 23 there is a threaded hole 44. An identical threaded hole 45 is through the center of connecting plate 30. Threaded wing nut lock screws 46 and 47 are mounted in holes 44 and 45, respectively, and press on the clamping-block-assembly inserts 40 and 41 at indentation 43 of each of the respective clamping-block-assembly inserts.

In Fig. 4, a liquid container 48, holding a liquid 49, is located under and around the clamp-assembly members 24 and 31.

In the construction of the invention, the clamp-assembly members 24 and 31 are positioned in definite relationship to each other. The open side of stationary clamp-assembly member 24 faces angularly upward and the stationary clamp-assembly member 24 makes an included angle of from 89° to 60° with a substantially horizontal plane. When the movable clamp-assembly member 31 is in the farthermost position from the stationary clamp-assembly member 24 with the test sample in a straight-of-way or unflexed position, as illustrated in Fig. 2, stationary clamp-assembly member 24 and movable clamp-assembly member 31 are located in projected planes that are parallel planes and lie diametrically opposite one from the other with the open side of each clamp assembly member facing the other member. When the movable clamp-assembly member 31 is in the closest position to the stationary clamp-assembly member 24 with the test sample in a flexed or compressed position, as illustrated in Fig. 1, stationary clamp-assembly member 24 and movable clamp-assembly member 31 are located in projected planes that intersect with an included angle of from 25° to 40°. For the dynamic liquid-penetration test, an included angle formed by the intersection of the projected planes of clamp-assembly members 24 and 31 of from 30° to 35° is preferred, when the movable clamp-assembly member 31 is in the closest position to the stationary clamp-assembly member 24.

Alternatively, the position of the clamp-assembly members 24 and 31 in definite relationship to each other may be defined with reference to the projected substantially horizontal plane of the base plate 10. The open face of the stationary clamp-assembly member 24 faces angularly upward. Stationary clamp-assembly member 24 is positioned making a definite included angle of from 89° to 60° with a plane parallel to the projected horizontal plane of the base plate 10. For the dynamic liquid-penetration test, an included angle of from 85° to 75° with a plane parallel to the projected horizontal plane of the base plate 10 is preferred. Movable clamp-assembly member 31, when in the uppermost position of the test cycle with a test sample A in the straight-of-way or unflexed position, as illustrated in Fig. 2, is in a parallel plane relationship to stationary clamp-assembly member 24 with the open side of each of the clamp-assembly members 24 and 31 facing each other. When movable clamp-assembly member 31 is in the uppermost position of the test cycle or the farthermost position of the stationary clamp-assembly member 24, a plane that encompasses both clamp-assembly members 24 and 31 will be perpendicular to the said projected parallel planes of the same clamp-assembly members. The open face of the clamp-assembly member 31 is positioned facing downward making a definite included angle of from 89° to 60° with a plane parallel to the projected horizontal plane of the base plate 10. For the dynamic liquid-penetration test, an included angle of from 85° to 75° with a plane parallel to the projected horizontal plane of the base plate 10 is preferred. Movable clamp-assembly member 31, when in the lowermost position of the test cycle of the test sample in a flexed or compressed position, as illustrated in Fig. 1 is positioned at an angle of from 85° to 129° with the projected horizontal plane of the base plate 10. For the dynamic liquid-penetration test, an angle of from 105° to 120° with the projected horizontal plane of the base plate 10 is preferred.

The length of lever 27 from pin 25 to connecting plate 30 is equal to the length of link 29 from pin 26 to connecting plate 30. The lengths of arms 21 and 22, respectively, from pins 25 and 26, respectively, to side plates 12 and 13, respectively, are equal and are preferably the same length as the length of lever 27 from pin 25 to connecting plate 30 and the length of link 29 from pin 26 to connecting plate 30.

In the construction of the invention, this length dimension and the location of pivot pins 25 and 26 are selected, so that movable clamp-assembly member 31, when the test apparatus is in operation, moves through the arc of a definite angle of from 25° to 40° with a preferred arc movement of from 30° to 35° encompassed by the arc between lines projected from pivot pins 25 and 26, respectively, to the corresponding nearest point of the movable clamp-assembly member 31 when movable clamp-assembly member 31 is in the farthermost and closest position to the stationary clamp-assembly member 24.

In operation of the invention for a flex test, a sheet sample of the material to be tested is cut to a rectangular sample, generally designated A, of suitable size and placed with its ends in the clamp-assembly members 24 and 31 with clamp-assembly member 31 in the farthermost position of the test cycle from stationary clamp-assembly member 24. Clamping-block-assembly inserts 40 and 41 are placed in clamp-assembly members 24 and 31, respectively, on top of the ends of the sample A of material located within the clamp-assembly members. Wing nut screws 46 and 47 are tightened against indentations 43 forcing the resilient surfaces 42 of clamping-block-assembly inserts 40 and 41 tightly against the ends of the material sample A, thus clamping test sample between the clamping-block-assembly inserts 40 and 41 and the clamp-assembly members 24 and 31, respectively. The sample A of material in the clamped position in the apparatus has now assumed a trough shape. The power source, electric motor 11, is started and the rotation of drive shaft 15 causes rotation of gear 16 which is keyed to drive shaft 15. Gear 16 which meshes with gear 17 rotates on pin 18 and causes movement of link 20 which is rotatably mounted on pin 19 which is mounted off center of gear 17. The movement of link 20 is an oscillating forward-and-back movement relative to the base plate 10. The movement of link 20 which at one end is rotatably mounted on pin 28 which is affixed to one end of a lever 27 causes lever 27 to move rotatably on pivot pin 25. The terminal end of lever 27 farthest from pin 28 moves in a rotatably oscillating upward-and-downward motion relative to the base plate 10, causing connecting plate 30 and attached clamp-assembly member 31 to move in a rotatably oscillating movement toward and away from the stationary clamp-assembly member 24.

During the test cycles of repeated flexing of the test sample of material, stationary clamp-assembly member 24 remains in a fixed position and movable clamp-assembly member 31 moves on pivotally mounted lever 27 and link 29 rotatably alternately toward and away from the stationary clamp-assembly member 24. The movement of clamp-assembly member 31 in a rotatably oscillating movement toward and away from the stationary clamp-assembly member 24 permits the clamped sample of material to be compressed, causing the sample of material to buckle and crease. Repeated cycles of compression with buckling and creasing of the sample of material occur as the motor 11 operates and continues to rotate drive shaft 15.

In operation of the embodiment of the invention where a dynamic liquid-penetration test is being run, the operational procedure is the same as in the flex test except that a liquid container, located under and around clamp-assembly members 24 and 31, is partially filled to a suitable height with a suitable liquid; or alternatively the trough formed by the sample A of material may be partially filled with a suitable liquid. Where the container is partially filled with the liquid and the sample A of material is partially immersed in the liquid, by observation, or other sensing means, the pentration, seepage, or leakage of the liquid to the inside surface of the sample A of material may be determined. Where the trough portion of the sample A of material is partially filled with the liquid, by observation, or other sensing means, the penetration, seepage, or leakage of the liquid to the exterior surface of the sample of material may be determined.

In operation of the embodiment of the invention where a liquid container partially filled with liquid to a suitable height is located under and around the clamp-assembly members 24 and 31 so that a dynamic liquid-penetration test may be run, the closed back sides 38 and 39 of the clamp-assembly members 24 and 31, respectively, prevent liquid from flowing, leaking or splashing into the hollow trough formed by the clamped sample of material. The closed back sides 38 and 39 also prevent contact of the liquid with the cut side edges of the clamped sample of material that extend beyond the resilient surfaces of the clamping-block-assembly inserts 40 and 41. Some test materials may be composed of liquid-absorbing fibers and one side of the material may not have been treated to prevent liquid absorption. Where a material whose one side is capable of liquid absorption forms the inner surface of the hollow trough of a clamped sample of material, the closed back sides 38 and 39 prevent the liquid in the container from contacting the inner surface of the sample of material extending beyond the resilient surfaces of the clamping-block-assembly inserts 40 and 41 and any wicking, capillary, or absorbing action of the material to cause liquid to move into the hollow trough of the clamped sample of material will not be able to occur. In those test devices where liquid can contact the sample of material extending beyond the resilient surfaces of the clamping-block-assembly inserts, liquid may flow into the hollow trough of the clamped sample of material and misleading and inaccurate test results may be obtained.

In operation of the embodiment of the invention where a liquid container partially filled with liquid to a suitable height is located under and around the clamp-assembly members 24 and 31 so that a dynamic liquid-penetration test may be run, it is important that the liquid level of the container be at or above the portion of the test sample that buckles and creases upon repeated test cycles so that a valid comparison between test results may be obtained. Those test devices, that do not have the unique positioning of the clamp-assembly members of this invention, have not been completely successful in maintaining a suitable liquid level in the container, so that liquid would be always at or above the portion of the test sample that buckles and creases without liquid flowing over the sides of the test sample into the hollow trough of the clamped sample of material when a large degree of repeated sample flexing and buckling is permitted. The difficulty encountered in these prior-art devices is that when the liquid level is at or above the portion of the test sample that buckles and creases, the liquid may flow over the sides of the test sample into the hollow trough of the clamped sample of material; or if the liquid level is maintained low enough not to overflow the sides, the portion of the test sample that buckles and creases is not continuously immersed in the liquid during the repeated test cycles. In this invention the unique positioning of the clamp-assembly members 24 and 31 permit a large degree of sample buckling and creasing, while keeping the portion of the test sample that buckles and creases continuously immersed in the liquid during repeated test cycles without any liquid flow into the hollow trough of the clamped sample of material. This is accomplished by positioning stationary clamp-assembly member 24 at a definite angle facing upward to a substantially horizontal plane and movable clamp-assembly member 31 when in the farthermost position from the stationary clamp-assembly member 24 at a sufficient distance from the top of the liquid level that the arc movement of movable clamp-assembly member 31 to the closest position to stationary clamp-assembly member 24 permits movable clamp-assembly member 31 only to enter the liquid to a depth that is insufficient to cause liquid to flow into the hollow trough of the clamped sample of material. At the same time the position of the stationary clamp-assembly member 24 maintains continuously the immersion in the liquid of the portion of the sample of material that buckles and creases during the repeated oscillating movements of the movable clamp-assembly member 31.

Numerous modifications of this invention, without departing from the spirit of the invention, are possible and will be obvious to those skilled in the art. By suitable selection of a power source, gears 16 and 17 could be eliminated and link 20 driven directly from an eccentric pin mounted on drive shaft 15. Other gear, link, and lever arrangements, than have been illustrated, may be used to drive the test apparatus. For a power source, an electric motor is preferred, but any other power means and drive arrangements providing for a rotating oscillating movement to a movable clamp-assembly member can be used. A single power source can drive gears or pulleys for a multiple test device whereby a plurality of pairs of clamping-block asemblies are used and a plurality of materials are tested simultaneously. A counting means may be mounted to the driving mechanism of gears and links, and the counting means can record the flexing cycles and/or fraction of flexing cycles made by the test apparatus on the test sample, and/or a timing mechanism may be attached to the power source to permit a recording of time elapsed between start and completion of the test.

The invention provides a simple, inexpensive test apparatus for flex-testing of numerous flexible and pliable materials and for dynamic liquid-penetration testing of numerous flexible and pliable materials. The positioning of the pair of test clamp members in relation to each other permits the obtaining of sufficient flexing of the test sample, so that a severe, but rapid, reproducible test may be made on a variety of flexible and pliable materials.

The invention described can be used in conjunction with various temperatures and humidities, and the test materials may be previously conditioned.

The invention may be embodied in other specific forms without departing from the spirit or essential attributes thereof, and the present embodiment, illustrated and described, is to be considered in all respects as illustrative and not restrictive, reference being had to the appended claims rather than to the foregoing description, to indicate the scope of the invention.

What is claimed is:

1. In an apparatus for flex-testing of a sheet of a flexible and pliable material, said apparatus comprising a pair of clamp members composed of a stationary clamp member and a movable clamp member, a means for moving the movable clamp member in a rotatably oscillating movement toward and away to a closest position and a farthermost position from the stationary clamp member, and so constructed and arranged that said clamp members clamp said sheet in an unflexed open trough-shaped configuration with the movable clamp member in the farthermost position from the stationary clamp member, an improvement comprising a combination of: said clamp members having an open front side with the open front side of the stationary clamp member facing angularly upward and facing the open front side of the movable clamp member; said stationary clamp member in a projected plane intersecting a horizontal plane with an included angle of 89° to 60°; said movable clamp member in the closest position from the stationary clamp member in a projected plane intersecting the projected plane of the stationary clamp member with an included angle of from 25° to 40°; said movable clamp member in the farthermost position from the stationary clamp member diametrically opposite the stationary clamp member and in a projected plane parallel to the projected plane of the stationary clamp member; said means for moving said movable clamp member comprising a lever affixed to said movable clamp member, said lever rotatably mounted on a pivot located on an axis parallel to the stationary clamp member and about midway between the stationary clamp member and the movable clamp member with the movable clamp member in the farthermost position, said axis extending from a point of intersection of said axis with a horizontal plane through an uppermost point of the open front side of the stationary clamp member to a point of intersection of said axis with a horizontal plane through a point of the open front side of the stationary clamp member midway between the uppermost point and a lowermost point of the open front side of the stationary clamp member; and so constructed and arranged that an application of said means for moving the movable clamp member imparts a buckling and creasing in a lower portion of said sheet clamped in the open trough-shaped configuration upon movement of the movable clamp member to the closest position from the stationary clamp member.

2. The apparatus having the improvement of claim 1 in which said stationary clamp member in the projected plane intersects the horizontal plane with an included angle of from 85° to 75° and in which said movable clamp member in the closest position from the stationary clamp member in the projected plane intersects the projected plane of the stationary clamp member with an included angle of from 30° to 35°.

3. In an apparatus for a dynamic liquid-penetration test of a sheet of a flexible and pliable material, said apparatus comprising a stationary clamp member, a movable clamp member, a means for moving the movable clamp member in a rotatably oscillating movement toward and away to a closest position and a farthermost position from the stationary clamp member, said stationary and movable clamp members and said means for moving the movable clamp member so constructed and arranged that said clamp members clamp said sheet in an unflexed open trough-shaped configuration with the movable clamp member in the farthermost position from the stationary clamp member, and a means for holding a liquid in contact with a substantial portion of one side of said sheet clamped in the unflexed open trough-shaped configuration, an improvement comprising a combination of: said clamp members having a closed back side and an open front side; the open front side of said stationary clamp member facing upward and facing the open front side of said movable clamp member; said stationary clamp member in a projected plane intersecting a horizontal plane with an included angle of 89° to 60°; said movable clamp member in the closest position from the stationary clamp member in a projected plane intersecting the projected plane of the stationary clamp member with an included angle of from 25° to 40° with said movable clamp member in said closest position in said projected plane at an elevation at least the elevation of the stationary clamp member; said movable clamp member in the farthermost position from the stationary clamp member diametrically opposite the stationary clamp member and in a projected plane parallel to the projected plane of the stationary clamp member; said means for moving said movable clamp member comprising a lever affixed to said movable clamp member, said lever rotatably mounted on a pivot located on an axis parallel to the stationary clamp member and about midway between the stationary clamp member and the movable clamp member with the movable clamp member in the farthermost position, said axis extending from a point of intersection of said axis with a horizontal plane through an uppermost point of the open front side of the stationary clamp member to a point of intersection of said axis with a horizontal plane through a point of the open front side of the stationary clamp member midway between the uppermost point and the lowermost point of the open front side of the stationary clamp member; and so constructed and arranged that an application of said means for moving the movable clamp member imparts a buckling and creasing in a lower portion of said sheet clamped in the open trough-shaped configuration upon movement of the movable clamp member to the closest position from the stationary clamp member and continuously maintains said liquid in contact with one side of said portion of said sheet to which has been imparted a buckling and creasing; whereby there may be obtained a dynamic liquid-penetration test of said sheet without a flowing or leaking of liquid to the other side of said sheet other than a liquid penetration and leakage upon failure of the portion of said sheet to which is imparted a buckling and creasing.

4. The apparatus having the improvement of claim 3 in which said stationary clamp member in the projected plane intersects the horizontal plane with an included angle of from 85° to 75° and in which said movable clamp member in the closest position from the stationary clamp member in the projected plane intersects the projected plane of the stationary clamp member with an included angle of from 30° to 35°.

References Cited in the file of this patent

UNITED STATES PATENTS

| 1,512,063 | Sproull | Oct. 21, 1924 |
| 2,514,202 | Prettyman et al. | July 4, 1950 |
| 2,657,573 | Castricum | Nov. 3, 1953 |
| 2,719,429 | Hopton | Oct. 4, 1955 |

FOREIGN PATENTS

| 700,171 | France | Dec. 22, 1930 |